United States Patent [19]

Ditzig

[11] Patent Number: 4,478,364

[45] Date of Patent: Oct. 23, 1984

[54] METHOD OF MOUNTING AND CLEANING ELECTRICAL SLIDE SWITCH OF FLUSH THROUGH DESIGN

[75] Inventor: Albert F. Ditzig, Hoffman Estates, Ill.

[73] Assignee: RE-AL, Inc., Wheeling, Ill.

[21] Appl. No.: 404,771

[22] Filed: Aug. 3, 1982

Related U.S. Application Data

[62] Division of Ser. No. 205,584, Nov. 7, 1980, Pat. No. 4,366,351.

[51] Int. Cl.[3] .............................................. B23K 35/24

[52] U.S. Cl. ............................... 228/201; 228/180 R; 228/215

[58] Field of Search ..................... 228/180 R, 170, 39, 228/215, 103, 104, 201, 202; 29/622, 839, 840; 134/11, 31

[56] References Cited

U.S. PATENT DOCUMENTS

| | | | |
|---|---|---|---|
| 2,740,193 | 4/1956 | Pressel | 228/180 R |
| 2,852,417 | 9/1958 | Kearney | 134/11 X |
| 3,483,616 | 12/1969 | Shamphe | 228/203 X |
| 3,582,578 | 6/1971 | Lockard | 200/16 |
| 3,733,218 | 5/1973 | Begun | 134/11 X |
| 3,755,886 | 9/1973 | Hermann | 228/201 |
| 3,834,015 | 9/1974 | Di Renzo | 228/180 R X |
| 3,849,610 | 11/1974 | Lockard et al. | 200/5 R |
| 3,878,344 | 4/1975 | Lockard | 200/6 B |
| 3,883,705 | 5/1975 | Sebastian et al. | 200/6 B |
| 3,904,430 | 9/1975 | Tipping et al. | 134/11 |
| 3,917,921 | 11/1975 | Jakubauskas | 200/333 |
| 3,923,541 | 12/1975 | Healy | 134/11 X |
| 3,971,903 | 7/1976 | Wilentchik | 200/16 C |
| 3,974,346 | 8/1976 | Keprda | 200/5 B |
| 4,012,608 | 3/1977 | Lockard . | |
| 4,017,329 | 4/1977 | Larson | 134/22.12 |
| 4,032,033 | 6/1977 | Chu et al. | 228/201 X |
| 4,052,580 | 10/1977 | Stanish | 200/159 R |
| 4,068,792 | 1/1978 | Dixon | 228/39 X |
| 4,077,467 | 3/1978 | Spigorelli | 228/180 R |
| 4,092,504 | 5/1978 | Kotaka | 200/16 D |

FOREIGN PATENT DOCUMENTS

| | | | |
|---|---|---|---|
| 2720293 | 11/1978 | Fed. Rep. of Germany | 228/39 |
| 974786 | 11/1964 | United Kingdom . | |
| 1233571 | 6/1968 | United Kingdom . | |
| 1523136 | 10/1975 | United Kingdom . | |

*Primary Examiner*—Kenneth J. Ramsey

*Assistant Examiner*—M. Jordan

*Attorney, Agent, or Firm*—Keil & Weinkauf

[57] ABSTRACT

A method for mounting an electrical slide switch on a printed circuit board having apertures formed therein by means of a wave soldering after putting protective material between the electrical lead contacts. The switch is then cleaned by passing a solvent through the open areas after which the protective material is removed.

2 Claims, 5 Drawing Figures

METHOD OF MOUNTING AND CLEANING ELECTRICAL SLIDE SWITCH OF FLUSH THROUGH DESIGN

This is a division, of application Ser. No. 205,584, filed Nov. 7, 1980 now U.S. Pat. No. 4,366,351.

INTRODUCTION

The present invention relates generally to an improved miniature electrical slide switch and method of mounting the same and, more particularly, to such a switch which has a flush through design and a self-adjusting contact arrangement.

BACKGROUND OF THE INVENTION

Miniature switches of the so-called "dualin-line package" (DIP) design, for which the switch of the present invention is readily adapted, are well known in the electronic's field. An assembly of a multitude of such individual switches which can be operated independently from one another are commonly mounted on a printed circuit board having two rows of mounting holes of standardized configuration. The switch leads are soldered to the foil side of the board thereby providing for the electrical connection of various circuits disposed on the circuit board.

Such known switches have been of a cam operated design as represented by U.S. Pat. Nos. 3,878,344 and 3,883,705 or have utilized a slide actuated configuration as shown by U.S. Pat. Nos. 3,849,610; 3,917,921; 3,974,346; 4,012,608 and 4,092,504.

In order to reduce assembly costs, such switches are generally mounted on the printed circuit board by a technique known in the electronic's industry as wave soldering. With such a technique, the printed circuit board with the switch positioned thereon is carried by a conveyor to a molten solder bath which is brought into contact with foil side of the circuit board. In this manner the switch terminal leads which protrude through the foil side of the circuit board are joined by the solder to the foil thereby completing the electrical circuit therebetween.

However, due to the contamination caused by the oils and fluxes used in this process, many of such DIP switches are sealed in order to protect their switching contacts. Such sealed switches are usually epoxied at their terminal base and taped over the top, actuator portion thereof. The tape is removed after the soldering process.

In addition to its added expense, this procedure has led to numerous problems affecting the reliability of the switches. For example, a slight leak in the sealed switch would permit the cleaning solvents used in the process to enter the switch and deposit contaminants on the contacts which would be impossible to remove. Furthermore, the sealed design of the switches may produce out-gassing problems from the plastic materials used in their construction due to the high temperatures used in the process. Likewise, due to their sealed design, it is impossible to inspect the switches prior to soldering them on the circuit board, thereby increasing the likelihood of a defective switch being installed in the component system which is relatively expensive to remove once the assembly process is completed.

A further problem associated with prior DIP switch designs is that they have a high failure rate due to defective contact operation. This problem is due to the miniature design of the switch which requires the use of extremely small and thin contact terminals. Hence, unless the contacts are precisely aligned with respect to each other, a reliable electrical connection between them cannot be achieved.

In order to overcome this problem, DIP switch contact designs such as are shown in U.S. Pat. Nos. 3,974,346; 4,012,608 and 4,092,504 have been developed to achieve positive contact operation. These switches utilize a separate, downwardly biased bridging element to electrically connect the contact terminals which are mounted on the circuit board. Although such switches are more reliable in their operation, they are also more complex and expensive to manufacture. An additional inherent disadvantage of such a design is that two independent electrical connections must be established within the switch in order to electrically connect the contact terminals. That is, the bridging element must establish electrical contact with both contact terminals in order to complete the electrical circuit through the switch. Hence, this factor doubles the possibility for failure of the switch due to one or the other of the contact terminals becoming contaminated or being out of alignment with the bridging element.

BRIEF DESCRIPTION OF THE INVENTION

The improved switch design of the present invention eliminates the above-described drawbacks found with conventional DIP switch designs by providing a switch that is simple and inexpensive to manufacture and install and which is extremely reliable in its operation.

The switch of the present invention has a generally open, flush through design which avoids the accumulation of contaminates therein during the soldering operation and which makes the switching contacts extremely accessible for cleaning and inspection. In addition, since it is not necessary to cover the switch slide actuators of the present invention with tape during the mounting operation, they are not thusly limited in their size and shape as with conventional sealed DIP switches.

A further advantage of the present invention is that a unique two-element, overlapping contact design is utilized which is self adjusting and extremely positive and reliable in its operation. Hence, after the switch is assembled, its contact terminals will permanently deform into their desired configuration after the slide actuator of the switch is initially operated, thereby avoiding the precise contact alignment required with conventional DIP switch designs.

DESCRIPTION OF THE PREFERRED EMBODIMENT

Figure 1:
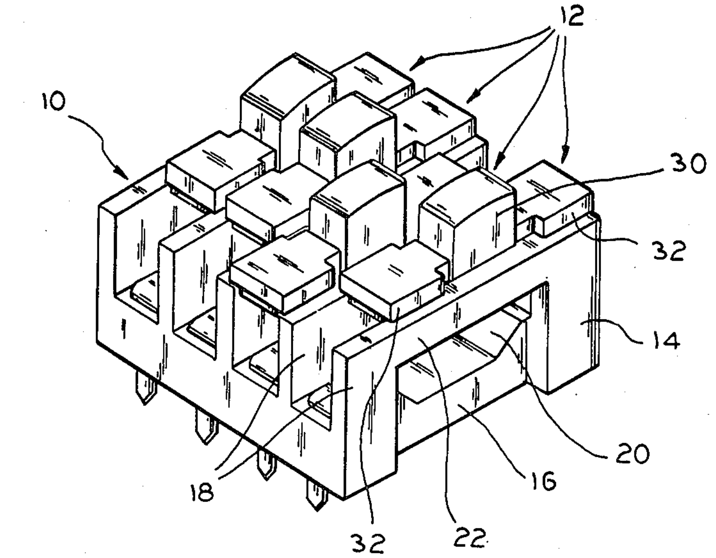
FIG. 1 is an enlarged perspective view of a multiple stage switch constructed in accordance with an embodiment of the present invention.

FIGS. 1 through 4 generally illustrate a switching assembly 10 having a plurality of minature electrical slide switches 12 constructed in accordance with an embodiment of the present invention. Since each of the slide switches 12 are identically constructed, the same reference numerals will be utilized to refer to corresponding parts thereof.

Slide switch 12 consists of a housing 14 which may be constructed of a dielectric material containing glass reinforced polyester or the like having a bottom wall 16 and a pair of spaced side supports 18 extending vertically therefrom. Each side support 18 has an open area 20 formed in it which communicates with the interior area of the housing 14 and which defines a top rail 22 extending longitudinally on either side thereof.

Figure 3:
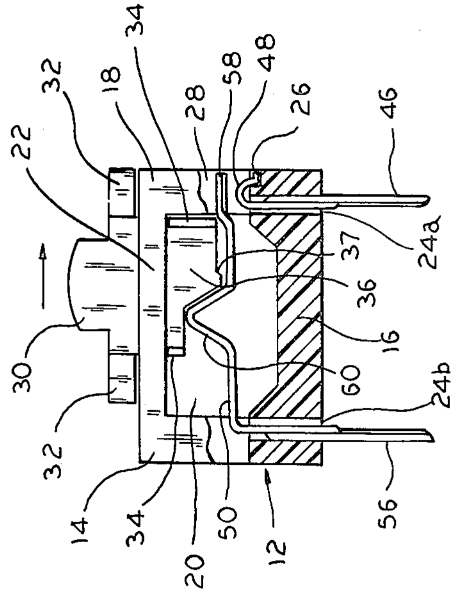
FIG. 3 is a fragmentary side sectional view of a portion of the switch shown in FIG. 1 illustrating its contacts in their electrically nonconducting "off" position.
Figure 4:
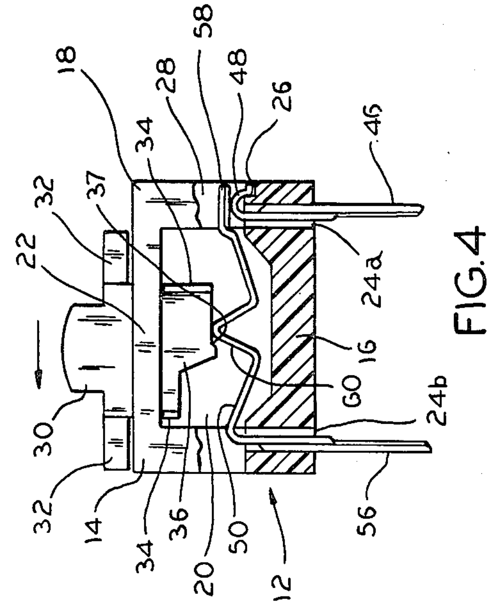
FIG. 4 is a fragmentary, side sectional view similar to FIG. 3 illustrating the contacts of the switch in their electrically conducting "on" position.

Actuator 30 which may be constructed of a dielectric material such as nylon or the like is slidably mounted between adjacent pairs of rails 22 by means of an upper lip 32 which rests on the upper surface of rails 22 and ears 34 which extend horizontally beneath rails 22 into open areas 20. As is best illustrated by FIGS. 3 and 4, ears 34 also limit the distance which actuator 30 is permitted to slide back and forth along top rails 22. Actuator 30 also has a cam portion 36 which protrudes downward into housing 14. The purpose and operation of this element will be more fully discussed below.

Electrical leads 40,50 may be mounted within housing 14 by means of their respective leg portions 42,52 being press fitted into slots 24*a* and 24*b* which are formed through the bottom wall 16 of housing 14 along its lateral ends. Barbs 44,45 may be formed along leg portions 42,52, respectively, in order to securely hold the electrical leads in place within the switch housing. When electrical leads 40,50 are seated within housing 14, leg portions 42,52 extend below housing bottom wall 16 to form respective electrical terminals 46,56 which may be so spaced to correspond to the standard spacing of DIP apertures formed in a printed circuit board. Furthermore, the lengh of terminals 46,56 extending below the bottom wall of the housing should be sufficient to permit them to protrude beyond the foil side of the printed circuit board so as to insure a good solder connection therebetween.

The other end of electrical leads 40,50 terminate in contact areas 48,58 respectively. These contact areas may have a silver or gold coating deposited over the electrical lead material in order to assure good electrical conductivity therebetween when brought into contact with one another. When properly positioned within the switch housing, contact area 58 of electrical lead 50 will overly contact area 48 of electrical lead 40.

As is best illustrated by FIGS. 3 and 4, when seated within the housing, the contact end of electrical lead 40 will be rigidly supported by a portion 26 of housing bottom wall 16. In this manner, the portion of lead 40 supporting contact area 48 will not deform during repeated use of the switch thereby insuring the reliable operation thereof.

Figure 2:
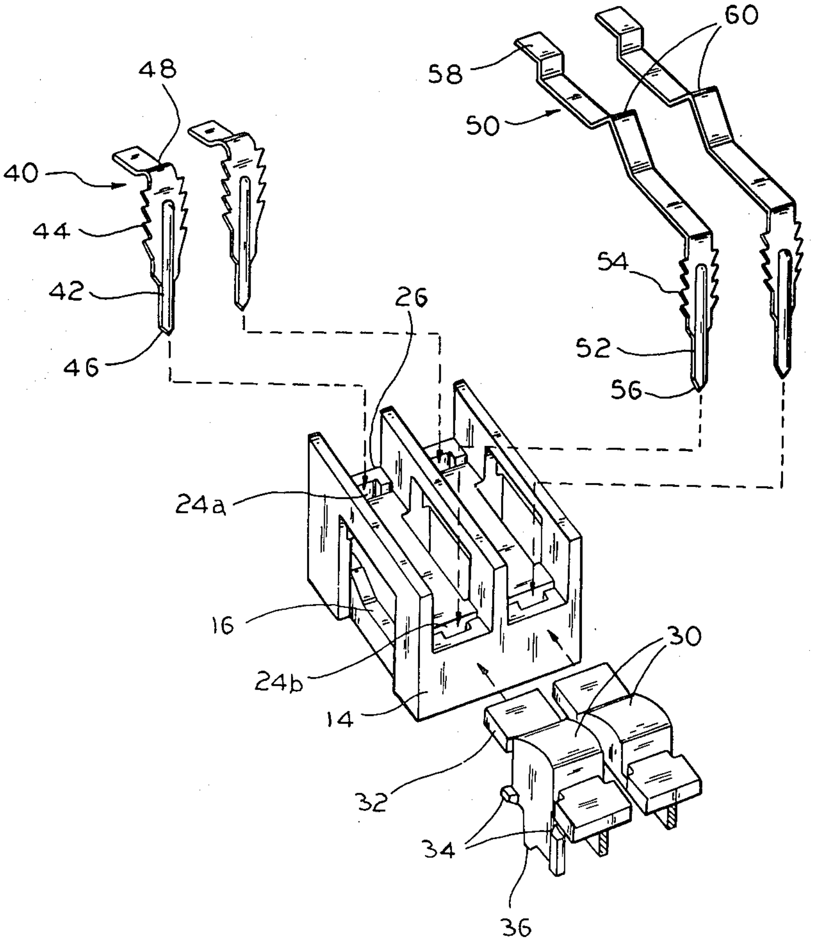
FIG. 2 is an exploded view of a portion of the switch shown in FIG. 1.

FIG. 2 illustrates by means of phantom lines and arrows the simple assembly of this particular embodiment of the present invention. Electrical leads 40 are inserted into slots 24*a* formed in housing bottom wall 16 and then overlying electrical leads 50 are inserted into their respective slots 24*b*. After these electrical leads are seated within the housing, actuators 30 are forced between side supports 18 so that ears 34 will come to rest under top rails 22. Since housing 14 and actuators 30 are constructed of somewhat resilient plastic material, side supports 18 will deform laterally outward when ears 34 are pressed therebetween and will then snap back to their original position when ears 34 are properly seated within opening 20.

The operation of the assembled switch is best shown by FIGS. 3 and 4 where FIG. 3 shows the switch in the "off" position and FIG. 4 shows the switch in the "on" position.

Electrical lead 50 has an upwardly projecting portion 60 formed therein which is engageable by the downwardly protruding cam 36 of actuator 30. When in the "off" position of FIG. 3, this cam 36 does not engage lead projection 60 and the contact area 58 of the lead 50 will not engage contact area 48 of lead 40. However, when the actuator 30 is slid in the direction shown by the arrow in FIG. 4, cam 36 will engage lead projection 60 and will deflect contact area 58 against contact area 48 of lead 40, thereby completing an electrical circuit between electrical leads 50 and 40 and, hence, terminals 56 and 46 which are to be connected to the circuit board.

Actuator cam 36 also has a latching indentation 37 formed in it which will latchably engage lead projection 60 when its contact area is deflected against contact area 48 of electrical lead 40, thereby positively holding these contact areas in the "on" position.

Another important function served by projection 60 of electrical lead 50 is that it permits the lead to deform to the predetermined "off" shape shown in FIG. 3 after it is initially engaged by actuator cam 36, thereby insuring that contact area 58 deflects away from contact area 48 of electrical lead 40 when actuator cam 36 is moved to its disengaged position. This feature is important because when the electrical leads are initially installed as shown in FIG. 2, contact area 58 of lead 50 may engage contact area 48 of lead 40 even when actuator cam 36 is in the "off" position illustrated by FIG. 3 due to manufacturing and assembly variations. However, once the actuator is initially moved to the "on" position shown by FIG. 4, the bend in projection 60 will permit the electrical lead to deform to the desired "off" configuration shown by FIG. 3 when the actuator is moved to the "off" position.

A further desirable feature of the present switch design is that since the contact areas of the electrical leads are positioned adjacent to one lateral edge of the switch housing, the operation of the contacts can be easily inspected and cleaned through the open area 28 between housing side supports 18.

Figure 5:
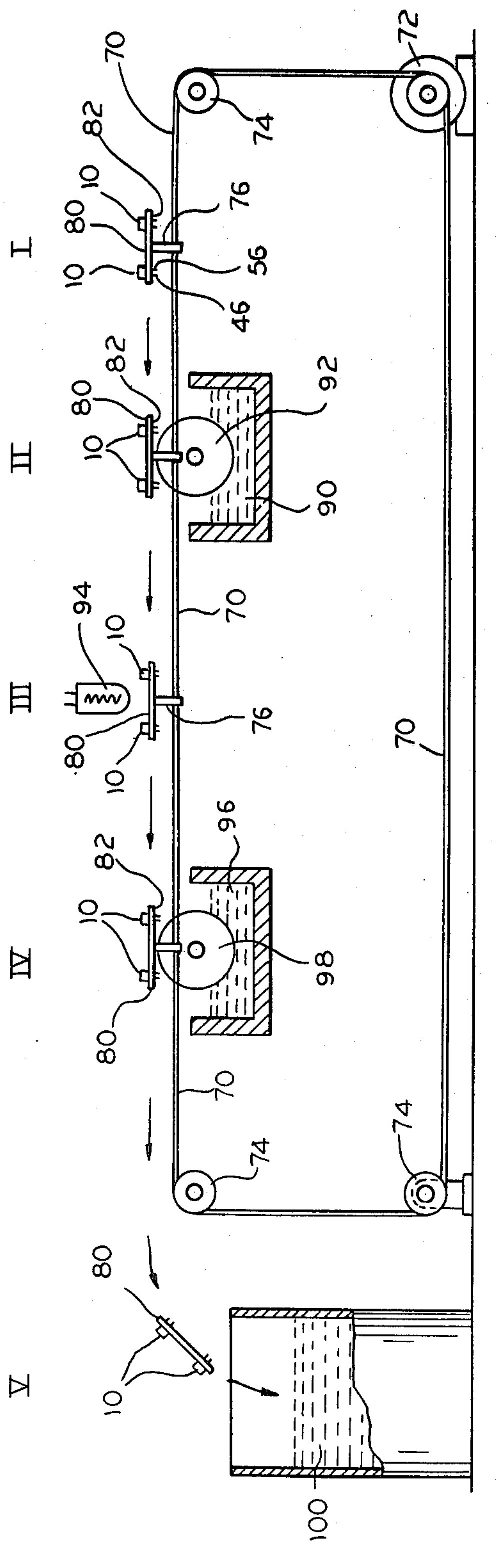
FIG. 5 is a diagrammatic illustration of a method of mounting the switch shown in FIG. 1.

The above-described switch of the present invention is also adaptable for use in a unique mounting method utilizing wave soldering techniques. FIG. 5 shows diagrammatically the steps of this process.

A conveyor chain or belt 70 is utilized to transport the switch and circuit board through the mounting operation. Conveyor 70 is driven by a motor 72 and is guided by idler pulleys 74. A clamping fixture 76 is utilized to mount the printed circuit board 80, upon which the switches 10 are to be mounted, on the conveyor. Switches 10 are constructed according to the abovedescribed preferred embodiment of the present invention.

At stage I of the mounting method, the circuit board 80 is fixed to the clamping fixture 76 and switches 10 are positioned with their electrical terminals 46,56 protruding through corresponding apertures formed in circuit board 80 below the downwardly facing foil side 82 thereof. If desired, either before or during this step, the contacts of the switch may be inspected through the open areas 20 and/or 28 of the switch housing in order to insure their proper operation. Typically, the other components (not shown) to be mounted on the circuit board are also placed on the circuit board at this time.

The circuit board 80 having switches 10 and the other components positioned thereon are then transferred by the conveyor 70 through stage II of the process which consists of a solder flux or oil bath 90 which prepares the foil side 82 of the circuit board and the protruding terminals 46,56 for soldering. Roller 92 may be conveniently used to deposit the flux or oil on the circuit board and terminals.

In many cases it is desirable to pre-heat the components to be soldered on the printed circuit board so as to prevent their bursting when subjected to the elevated temperature (450–550 degrees F.) of the solder wave. This is especially the case when glass-sealed components are to be mounted. Stage III of FIG. 5 shows a radiant heater 94 or the like which is utilized to heat the component side of the circuit board as it is conveyed thereunder.

Stage IV of the method shows the switch terminals 46,56 and foil side 82 of the circuit board being brought into contact with a flow solder wave 96 which deposits molten solder by means of roller 98 between the terminals and the foil. The solder wave contacts only the under side of the circuit board and is generally in contact therewith for 3 to 4 seconds.

At stage V of the method, the solder is allowed to cool and harden so as to establish an electrical connection between the switch terminals and their surrounding foil areas and to fix the switch and other components securely to the circuit board. At this point, the board can be manually removed from the conveyor and submerged in an ultra-sonic cleaning device 100 having a solvent therein or other such known cleaning devices in order to remove the waste deposits which have accumulated thereon during the soldering process. In the alternative, the conveyor system may be used to automatically pass the board through a Freon vapor degreaser or the like in order to remove the contaminates therefrom.

As noted above, conventional DIP switches cannot survive these cleaning processes because the solvents utilized accumulate contaminants from the fluxes and oils used in the wave soldering system and deposit these contaminants between the switch contacts causing them to malfunction. However, due to the open flow-through design of the switch of the present invention, the solvents will tend to pass through the switch rather than accumulating therein.

Furthermore, since the contact areas of the present switch are accessible through the openings formed in the switch housing, they may be inspected and easily recleaned if necessary with an aerosol freon type cleaner or the like after they are passed through the cleaning process of stage V.

Another option possible with the switches and mounting method of the present invention, is that a protective material such as an elastomeric foam sheet may be inserted between the switch contacts to protect them prior to passing the circuit board through the wave soldering process. This protective material may be then removed through the open areas of the switch after the circuit board is passed through the final cleaning stage, thereby insuring the non-contamination of the switch contacts regardless of how contaminated the cleaning solvents become.

While several particular embodiments of the present invention have been shown and described in detail, it should be understood that various obvious changes and modifications thereto may be made, and it is therefore intended in the following claims to include all such modifications and changes as may fall within the spirit and scope of this invention.

What is claimed is:

1. A method for mounting an electrical slide switch on a printed circuit board having apertures formed therein by means of a wave soldering process, said electrical slide switch having a housing with a pair of electrical leads with overlying contact areas positioned therein, said electrical leads having a leg portion protruding beneath said housing to form electrical terminals corresponding to said circuit board apertures, and a pair of spaced side supports supporting the slide actuator of said switch, said side supports having an open area communicating with the contact areas of said electrical leads and extending through said housing, said method comprising:

positioning the electrical terminals of the slide switch in the corresponding apertures of the circuit board so that said terminals will protrude beyond the foil side of said circuit board;

passing said protruding terminals and foil side of said circuit board through a means for preparing said terminals and foil for soldering;

bringing said terminals and foil into contact with a flow solder wave thereby depositing solder between said terminals and their surrounding foil areas;

cooling said solder so as to establish an electrical connection between said terminals and their surrounding foil areas and fix said switch on said circuit board;

cleaning said switch and circuit board by passing a solvent over said switch and circuit board, through the open areas of said switch side supports and between the contact areas of said electrical leads;

inserting a protective material between said electrical lead contact areas prior to passing said circuit board through the soldering preparing means; and removing said protective material through the open areas formed in said switch housing after cleaning said switch and circuit board.

2. The mounting method as recited in claim 18, wherein said protective material comprises an elastomeric foam material.

* * * * *